May 26, 1936.  F. W. BILLKER  2,041,742
CUTTING MACHINE
Original Filed Aug. 29, 1932
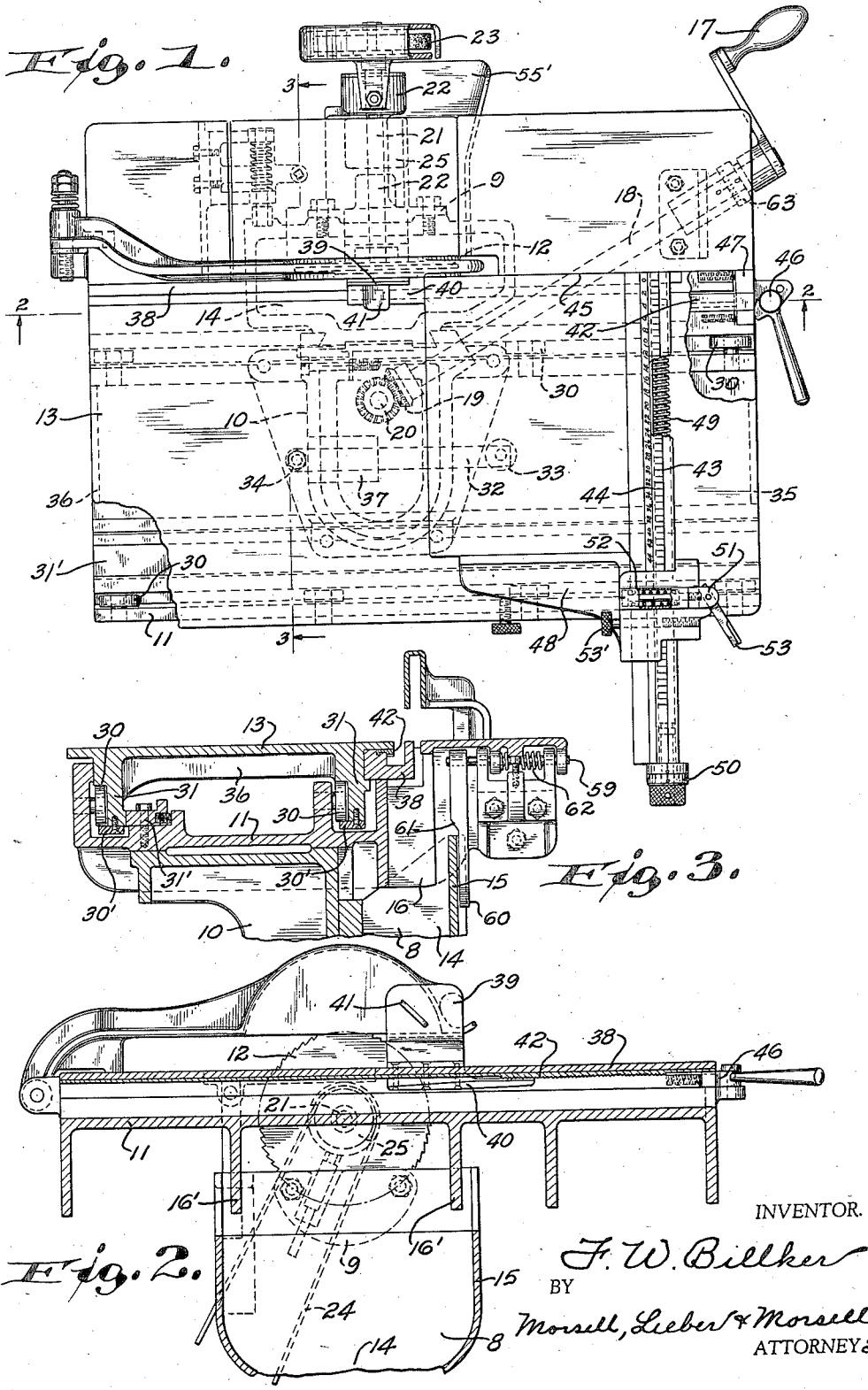
INVENTOR.
F. W. Billker
BY
Morsell, Lieber & Morsell
ATTORNEYS.

Patented May 26, 1936

2,041,742

UNITED STATES PATENT OFFICE 2,041,742

CUTTING MACHINE

Fredrick W. Billker, Milwaukee, Wis.

Original application August 29, 1932, Serial No. 630,753. Divided and this application March 4, 1935, Serial No. 9,167

6 Claims. (Cl. 29—69)

The present invention relates in general to improvements in cutting machines, and relates more specifically to improvements in the construction and operation of trimming mechanisms especially adapted for use in composing rooms of printing establishments to cut type, slugs, borders, plates, and the like.

Generally defined, an object of the invention is to provide a new and useful cutting machine which is simple in construction and efficient in operation.

Some of the more specific objects of the invention are as follows:

To provide improved mechanism for clamping the work in position in a cutting machine, especially adapted for composing room service, whereby maximum or minimum sizes and quantities of stock may be accurately trimmed or cut without endangering the operator, and which will eliminate waste of material due to inaccurate cutting.

To provide an improved pica gage structure for type, slug or plate trimming machines, whereby accurately cut desired lengths of stock may be rapidly and consistently produced.

To provide various other improvements in the details of construction and in the mode of manipulating cutting and trimming machines for composing room service, whereby the construction thereof is simplified and strengthened whereas the operation and use is made far more flexible, safe, accurate and speedy than in prior machines of this kind.

These and other objects and advantages will be apparent from the following detailed description.

The present application is a division of my original application Serial No. 630,753, filed August 29, 1932, and some of the improved features of cutting machine construction, disclosed but not specifically claimed herein, form the subject of said original application.

A clear conception of embodiments of the several features of the improvement, and of the construction and mode of operating saw trimmers built in accordance therewith, may be had by referring to the drawing accompanying and forming a part of this specification in which like reference characters designate the same or similar parts in the various views.

Fig. 1 is a top view of one of the improved saw type of trimming machines for type, plate, borders, slugs and the like, with portions thereof broken away to expose normally concealed details;

Fig. 2 is a transverse vertical section through the upper portion of the trimming machine, taken along the line 2—2 of Fig. 1; and Fig. 3 is another vertical section through the upper portion of the cutting machine, taken along the line 3—3 of Fig. 1.

The improved cutting machine specifically shown in the drawing by way of illustration, comprises in general a composite main frame formed of inter-related sections 8, 9, 10, 11, a rotary cutter or saw 12 journaled upon the upper fixed frame section 9, and a work support or table 13 movably mounted upon the upper adjustable frame section 11 and slidable in proximity to the saw 12.

The lower or base section 8 of the frame is constructed in the form of a hollow column having a vertical passage 14 therein extending downwardly from the saw 12. The upper portion 15 of the base section 8 is widened in the direction of extent of the saw 12 so as to insure delivery of all of the cuttings into the passage 14, and the upper fixed section 9 of the frame is firmly attached directly to the widened portion 15. The saw receiving portion of the upper adjustable frame section 11 is provided with depending aprons 16 for deflecting cuttings from the saw 12 into the passage 14. The sub-section 10 of the main frame is slidably associated with parallel dove-tail guides associated with the column of the base section 8, and is vertically adjustable along these guides by means of a crank 17 attached to a rotary shaft 18 which coacts through bevel gearing 19 with an upright jack shaft 20 cooperating with the frame sections 8, 10. The upper movable frame section 11 rests upon and is firmly secured to the sub-section 10, being vertically adjustable therewith relative to the fixed sections 8, 9.

The rotary saw 12 may be of the usual type having peripheral teeth and lateral trimming projections, and is mounted upon an end of a shaft 21 supported in journal bearings 22 carried directly by the upper normally fixed frame section 9. The saw shaft 21 may have an abrasive dressing wheel 23 secured to its opposite outer end, and is driven by a belt coacting with a pulley 25 carried by the medial portion of the shaft 21 between the bearings 22.

The work supporting table 13 is movably supported upon a series of rollers 30 horizontally journaled in the upper frame section 11, and has a top surface which lies in the plane of the uppermost side portion of the upper frame section 11 as shown in Fig. 3. The rollers 30 coact with parallel runways formed between depending ribs 31 of the table 13 and strips 30' coacting therewith, and the work table is movable forwardly or rearwardly until its edges are disposed laterally adjacent to the side of the saw 12, without causing tilting, jamming, or misalinement of the table. Such tilting is prevented by the constant coaction of at least four of the rollers 30 with the horizontal parallel runways of the ribs 31, and the horizontal sliding motion of the table is limited by a special stop shown in Fig. 1 consisting of a horizontally slidable link 32 having front and rear buffers 33, 34, the former of which is alternately engageable with the front and rear table flanges 35, 36 and the latter of which is engageable with a lug 37 rigidly attached to the upper frame section 11. The side of the table 13 adjacent to the saw 12, has a guide rail 38 attached thereto to form an L-shaped recess as shown in Figs. 2 and 3. The table 13 is also urged away from the saw plane so as to eliminate undesirable side play, by means of a spring pressed guide 31' coacting with one of the ribs 31. The saw 12 is operable in a plane closely adjacent to the outer side face of the rail 38, and a movable clamp 39 having a lower shoe 40 slidable within the recess formed by the rail 38, is also shiftable with or independently of the table 13, in close proximity to the plane of the saw 12, this clamp having a grip lug 41 projecting therefrom away from the saw plane and adapted to be engaged by the fingers of the operator. The upper portion of the shoe is notched for locking coaction with lower notches formed on a sliding locking bar 42, the latter being slidably confined in a groove formed between the rail 38 and the adjacent edge of the table 13, as illustrated in Fig. 3. The formation of the clamp shoe 40 is such that when the lug 41 is released, gravity acting upon the clamp 39 will cause the notches of the shoe 40 and bar 42 to interlock, but when upward pressure is applied manually by the operator to the lug 41, the shoe notches are released and the clamp 39 may be freely manually shifted along the rail 38.

Secured to the forward top portion of the table 13, is a pica gage bar 43 normally disposed at right angles to the plane of the saw 12 and having graduations 44 upon the upper face thereof. A piece of work such as a plate 45, or a series of type or border bars, may be clamped to the side of the bar 43 facing the saw 12, while resting upon the table 13, by means of the clamp 39 and bar 42. The front end of the frame section carries a manually operable locking cam 46 cooperable with a spring pressed plate 47 associated with the front end of the bar 42. In order to definitely position the work or plate 45 longitudinally of the gage bar 43, this bar is provided with an adjustable bracket 48 slidably engaging the bar 43. The bracket 48 may be advanced slowly along the bar 43 by means of an adjusting screw 49 having a vernier gage 50 associated with one end thereof, and may also be quickly shifted along the bar 43 upon release of the bracket 48 from the screw 49. The releasing mechanism for connecting and disconnecting the bracket 48 to and from the screw 49, comprises a spring pressed block 51 urged into engagement with the screw threads, by a spring 52, and capable of being retracted out of engagement with said threads, by means of a lever 53. When the block 51 engages the threads of the screw 49, the bracket 48 is held in fixed position relative to the bar 43 and table 13, and additional locking means in the form of a clamping screw 53' may be provided for preventing adjustment of the vernier gage 50 and for eliminating play.

The crank handle 17 normally serves to raise and lower the upper frame sections 10, 11 and the table 13, as previously indicated, and by virtue of the disposition of the shaft 18 at an angle as shown in Fig. 1, the handle 17 is conveniently accessible for manipulation by an operator standing in front or at the saw side of the machine, even when the table 13 is moved forward as far as possible. In order to permit accurate vertical adjustment of the work supporting table 13 for undercutting, the shaft 18 is provided with gage mechanism 63 which permits raising or lowering of the work, any predetermined distance from a fixed plane. When it is desired to undercut a piece of work such as a plate 45, the table 13 is first set so that the lower face of the overhanging end of the plate 45 will just touch the uppermost portion of the saw 12. The gage mechanism 63 may then be set to "0" and the desired depth of the undercut can be accomplished by means of the crank handle 17 which can be operated to lower the table 13 and the piece of work to proper horizontal position preparatory to producing the undercut.

When the cutting machine is being utilized to saw plates, etcetera, the table 13 is adjusted vertically to bring the top face of the frame portion of the table 13, into the horizontal plane of the table 13, and the saw 12 then projects a sufficient distance above this horizontal plane, to effectively saw the ends of the pieces of work advanced toward and past the saw by manual shifting of the table 13. During such cutting, the work is firmly attached to the table 13 in proper position, by the clamp 39 and bracket 48. Because of the location of the clamp 39 at the side of the gage bar 43 facing the saw 12, and the disposition of the bar 43 near the front of the table 13, obviously make it possible to handle pieces of work of maximum size without manual holding, since the clamp can be locked at any point along the table 13. The table 13 is confined to movement parallel to the plane of the saw 12, by the rollers 30, ribs 31, and the guide 31' which forces the adjacent rib 31 against the end wall of the frame section 11, and is prevented from tilting by the strips 30' and ribs 31 coacting with the rollers 30, and also by the limit stop mechanism of Fig. 1. During such cutting and trimming, the material removed by the saw 12, including the cuttings and dust, is delivered downwardly by the aprons 16' through the passage 14.

When the machine is to be utilized for sawing slugs into lengths, the upper frame 11 and table 13 may be lowered relative to the saw 12. The slug stock may be advanced along the gage bar 43 by shifting the bracket 48 toward the plane of the saw 12, and the clamp 39 may again be employed to hold the stock during sawing. While the cut slugs are delivered to the receiving chute, the finer cuttings and dust are again discharged past the aprons 16' through the passage 14.

The machine may also be utilized for undercutting in the manner previously described with the aid of the gage mechanism 63, and is adapted to cooperate with standard mitering attachments and line-up gages. It will be apparent from the foregoing description, that the improved cutting machine, while being of relatively simple and compact construction, is also highly flexible and efficient in operation. The various adjustments may be readily made to produce accurate results, and the mechanism is both safe and fool-proof in operation.

It should be understood that it is not desired to limit the invention to the exact details of construction herein shown and described, for various modifications within the scope of the claims may occur to persons skilled in the art.

It is claimed and desired to secure by Letters Patent:

1. In combination, a cutter, a work support movable past said cutter and having therein a recess extending parallel to and located near the plane of cutting, a gage bar mounted upon said support and extending over said recess, a clamp on one side of said bar slidable along said support closely adjacent to said plane and having a rigid toothed shoe movable along said recess, an actuating bar extending along said recess past said gage bar and having teeth engageable with the teeth of said shoe, and means associated with said actuating bar on the opposite side of said gage bar for moving said actuating bar to urge said clamp into clamping position.

2. In combination, a cutter, a work supporting table movable past said cutter, a member secured to said table adjacent to said cutter and forming a recess extending parallel to the plane of cutting and beneath the edge of said table, a gage bar carried by said table and extending across said recess, a clamp on one side of said bar slidable along said member and having a rigid toothed shoe movable along said recess beneath said table edge, an actuating bar extending along said recess past said gage bar and having teeth engageable with the teeth of said shoe, and operating means for said actuating bar located on the opposite side of said gage bar.

3. In combination, a cutter, a work supporting table movable past said cutter, an elongated member attached to said table adjacent to said cutter and forming a recess extending beneath the edge of said table, a gage bar mounted on said table and extending across said recess, a clamp on one side of said bar slidable along said table and having a rigid shoe movable along said recess beneath said table edge, an actuating bar extending along said recess past said gage bar and being engageable with said shoe to retain said clamp in fixed position, and means coacting with said actuating bar on the opposite side of said gage bar for operating said actuating bar.

4. In combination, a cutter, a work supporting table movable past said cutter, a member attached to the side of said table adjacent to said cutter and forming an elongated recess extending parallel to the plane of cutting and beneath the edge of said table, a gage bar carried by said table and extending across said recess and said member, a clamp on one side of said bar slidable along the top of said member and said table and having a rigid shoe movable along said recess beneath said table edge, said clamp being swingable to move said shoe away from said table edge, an actuating bar interposed between said table edge and said shoe and being interlockable with said shoe to prevent relative movement of said clamp and table, and operating means for said actuating bar located on the opposite side of said gage bar.

5. In combination, a cutter, a work supporting table movable along one side of said cutter and having a guide-way extending parallel to the plane of cutting, a gage bar carried by said table and extending across said guide-way, a clamp disposed on one side of said bar and having an integral toothed shoe movable along said guide-way, an actuating bar extending along said guide-way past said gage bar and having teeth engageable with the teeth of said clamp shoe, and operating means for said actuating bar located on the opposite side of said gage bar.

6. In combination, a cutter, a work supporting table movable along one side of said cutter and having a guide-way extending parallel to the plane of cutting, a gage bar carried by said table and extending across said guide-way, a clamp disposed on one side of said bar and having an integral toothed shoe movable along said guide-way, an actuating bar extending along said guide-way past said gage bar and having teeth engageable with the teeth of said clamp shoe, operating means for said actuating bar located on the opposite side of said gage bar, and means for moving said clamp along said guide-way independently of said operating means when said teeth are disengaged.

FREDRICK W. BILLKER.